A. G. BEARUP.
Improvement in Steam-Traps.

No. 115,809.

Patented June 13, 1871.

Witnesses:
Fred Haines
R. F. Kalucau

Inventor
Albert G. Bearup

UNITED STATES PATENT OFFICE.

ALBERT G. BEARUP, OF NEW YORK, N. Y., ASSIGNOR TO HIMSELF AND PATRICK CARRAHER, OF SAME PLACE.

IMPROVEMENT IN STEAM-TRAPS.

Specification forming part of Letters Patent No. 115,809, dated June 13, 1871.

*To all whom it may concern:*

Be it known that I, ALBERT G. BEARUP, of the city, county, and State of New York, have invented a new and useful Improvement in Steam-Traps, of which the following is a full, clear, and exact description, reference being had to the accompanying drawing forming part of this specification, and in which—

Figure 1:
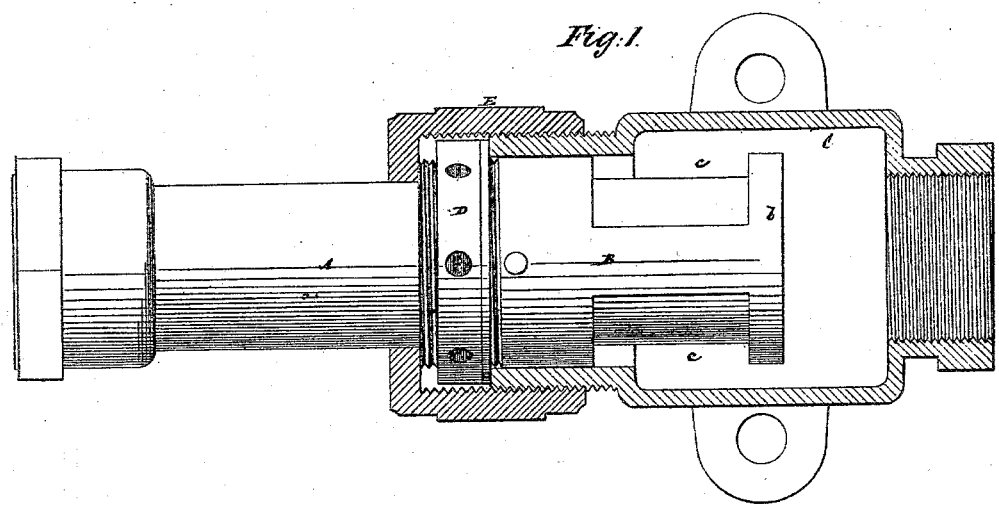
Figure 2:
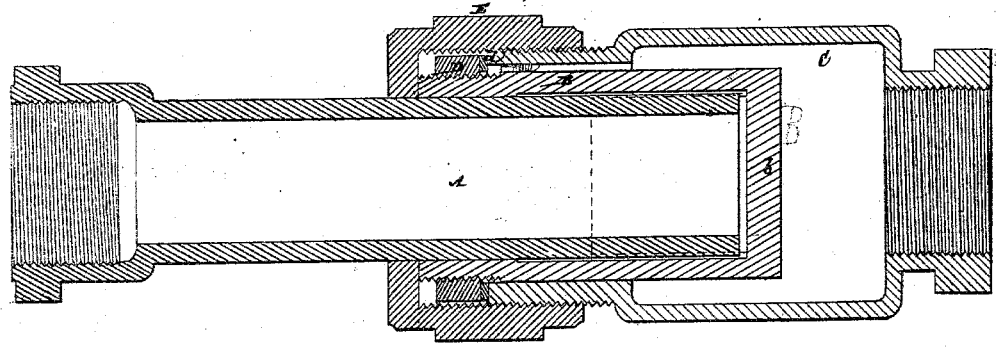

Figure 1 represents a partly sectional plan, and Fig. 2 a longitudinal section, at right angles to Fig. 1, of a steam-trap constructed in accordance with my improvement.

Similar letters of reference indicate corresponding parts.

My invention consists in an expansion steam-trap made up, in part, of an adjustable sleeve arranged to receive the end connection of a line of steam-pipes within it, and surrounded by a water-pipe connection which is made to form a close joint with the steam-pipe by an outside nut, said sleeve being of an open construction at its sides, but closed at its back end, whereby it is made to operate as a valve to provide, by expansion and contraction of the steam-pipes, for excluding the escape of steam, and to allow of the escape of water arising from condensation of the steam.

The adjustment of the sleeve to set it so that it will automatically close the end of the steam-pipe connection, when expanded, is effected by an independent nut arranged within the outer one on the inner end of the sleeve, and bearing against the inner end of the water connection. An expansion steam-trap thus constructed is simple, efficient, and perfectly reliable in its action.

Referring to the accompanying drawing, A represents the end connection of a line or series of steam-pipes employed to heat a building, or for any other purpose. B is the valvular sleeve, arranged to fit in a free but closed manner over the outer end of the steam-connection A, and of a closed construction at its back end $b$, but open at its side or sides, as at $c$. C is the water-pipe connection for carrying off water collecting in the steam-pipes as arising from condensation of the steam, or otherwise. This water connection is arranged to surround the sleeve B to within a certain distance of its forward end, where a nut, D, arranged to screw on the inner end of the sleeve, is made to bear preferably through an interposed packing, $d$, against the inner end of the water connection, for the purpose of setting the closed end $b$ of the sleeve at any necessary distance from the outer end of the steam connection A, to provide for the automatic action of the sleeve as a valve to open and close communication, by its side openings $c$ and closed end $b$, between the steam-pipes and water connection, as effected by the expansion and contraction of the steam-pipes. When once set, no further adjustment is required. Said sleeve may, if desired, be provided with a projection, $e$, made to fit a longitudinal groove in the water connection to form a guide for the sleeve. E is an outside nut or box, arranged to screw on the inner end of the water connection C, and to encircle the steam connection A, where it is made to bear against the inner end of the sleeve, thus serving to keep close or tight, as against leakage, the several connections, and to form an outside cap, as it were, to the whole.

What is here claimed, and desired to be secured by Letters Patent, is—

1. The valvular sleeve B constructed with a closed end, $b$, but formed with an opening or openings at its side, and arranged to fit the end of the steam connection A, as described, in combination with the adjusting-nut D and water connection C, substantially as specified.

2. The combination of the outside nut or screw-box E, the interior adjusting-nut D, the valvular sleeve B, and the water connection C, the whole being constructed and arranged essentially as described.

ALBERT G. BEARUP.

Witnesses:
JOHN SEMCKEN,
JAMES KNIGHTS.